(12) United States Patent
Kaźmierski et al.

(10) Patent No.: US 12,328,318 B2
(45) Date of Patent: Jun. 10, 2025

(54) TARGETED NOTIFICATION IN HETEROGENOUS NETWORK ENVIRONMENTS

(71) Applicant: Cisco Technology, Inc., San Jose, CA (US)

(72) Inventors: Mariusz Kaźmierski, Wieliczka (PL); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 345 days.

(21) Appl. No.: 17/903,106

(22) Filed: Sep. 6, 2022

(65) Prior Publication Data
US 2024/0080319 A1    Mar. 7, 2024

(51) Int. Cl.
| | |
|---|---|
| H04L 9/40 | (2022.01) |
| H04L 41/0823 | (2022.01) |
| H04L 41/12 | (2022.01) |
| H04L 67/75 | (2022.01) |

(52) U.S. Cl.
CPC ........ H04L 63/102 (2013.01); H04L 41/0836 (2013.01); H04L 41/12 (2013.01); H04L 63/101 (2013.01); H04L 63/104 (2013.01); H04L 63/108 (2013.01); H04L 67/75 (2022.05)

(58) Field of Classification Search
CPC ... H04L 63/101; H04L 63/102; H04L 63/104; H04L 63/108
USPC .......................................................... 726/4
See application file for complete search history.

(56) References Cited

U.S. PATENT DOCUMENTS

| | | | | |
|---|---|---|---|---|
| 7,886,033 B2* | 2/2011 | Hopmann | ........... | H04L 41/0893 709/224 |
| 8,060,592 B1* | 11/2011 | Watsen | ................. | H04L 41/082 709/225 |
| 8,478,849 B2* | 7/2013 | Marl | ................... | H04L 12/2807 709/223 |
| 8,676,972 B2* | 3/2014 | Ramaswamy | .......... | H04L 41/00 709/225 |
| 10,609,739 B2* | 3/2020 | Bao | ........................ | H04W 8/26 |

(Continued)

FOREIGN PATENT DOCUMENTS

CN            101119203 A      2/2010

OTHER PUBLICATIONS

CRC Press, CISSP Architecture, "Official (ISC)^2 Guide to the ISSAP CBK," Jan. 2011, 491 pages.

*Primary Examiner* — Dant B Shaifer Harriman
(74) *Attorney, Agent, or Firm* — Edell, Shapiro & Finnan, LLC

(57) ABSTRACT

A method is provided to determine administrator users associated with network devices in a network. The method includes sending to one or more network devices in a network or to an entity that manages or controls access to the one or more network devices, a query to identify one or more administrator users for each of the one or more network devices. The method involves obtaining a response to the query, the response including an identifier of each the one or more administrator users for a respective network device of the one or more network devices. The method may then involve using the identifier of each of the one or more administrator users for each of the one or more network devices to send a notification to the one or more administrator users.

20 Claims, 11 Drawing Sheets

(56) References Cited

U.S. PATENT DOCUMENTS

| | | | |
|---|---|---|---|
| 2003/0217285 A1 | 11/2003 | Sanchez Herrero et al. | |
| 2005/0283823 A1* | 12/2005 | Okajo | G06F 21/604 |
| | | | 726/1 |
| 2007/0124458 A1* | 5/2007 | Kumar | H04L 41/0681 |
| | | | 709/224 |
| 2008/0049779 A1* | 2/2008 | Hopmann | H04L 41/046 |
| | | | 370/431 |
| 2012/0290694 A9* | 11/2012 | Marl | H04L 41/0253 |
| | | | 709/224 |
| 2016/0380807 A1 | 12/2016 | Shevenell et al. | |
| 2017/0093664 A1* | 3/2017 | Lynam | H04L 41/0631 |
| 2017/0223070 A1* | 8/2017 | Lin | H04L 67/125 |
| 2018/0288065 A1* | 10/2018 | Selgas | H04L 63/105 |
| 2021/0058821 A1* | 2/2021 | Seo | H04L 12/4641 |
| 2022/0014429 A1 | 1/2022 | Kapadia et al. | |
| 2023/0117962 A1* | 4/2023 | Kaimal | H04L 63/029 |
| | | | 726/1 |
| 2023/0119503 A1* | 4/2023 | Maheve | H04L 9/0894 |
| | | | 709/221 |

\* cited by examiner

TARGETED NOTIFICATION IN HETEROGENOUS NETWORK ENVIRONMENTS

TECHNICAL FIELD

The present disclosure relates to networking systems and environments.

BACKGROUND

Large enterprise networks use a number of solutions from a single vendor that are often managed by different network teams (network team, server team, wireless team, security team, etc.). In addition, administration and maintenance of the network assets can be further split based on internal organization structure. As a result, a single enterprise network may several network administrative teams that manage different subset of network devices based on region/network asset location, —network asset type (switches, routers, access points, servers, Internet Protocol (IP) phones, cameras, security appliance, etc.), and functionality (Multiprotocol Label Switching (MPLS) core, distribution network, access layer, voice configuration, etc.).

DETAILED DESCRIPTION

Overview

In one embodiment, a computer-implemented method is provided that determines administrator users associated with network assets (network devices) in a network. The method includes sending to one or more network devices in a network or to an entity that manages or controls access to the one or more network devices, a query to identify one or more administrator users for each of the one or more network devices. Next, the method involves obtaining a response to the query, the response including an identifier of each of the one or more administrator users for a respective network device of the one or more network devices. The method may then involve using the identifier of each of the one or more administrator users for each of the one or more network devices to send a notification to the one or more administrator users for each of the one or more network devices.

Example Embodiments

Figure 1:
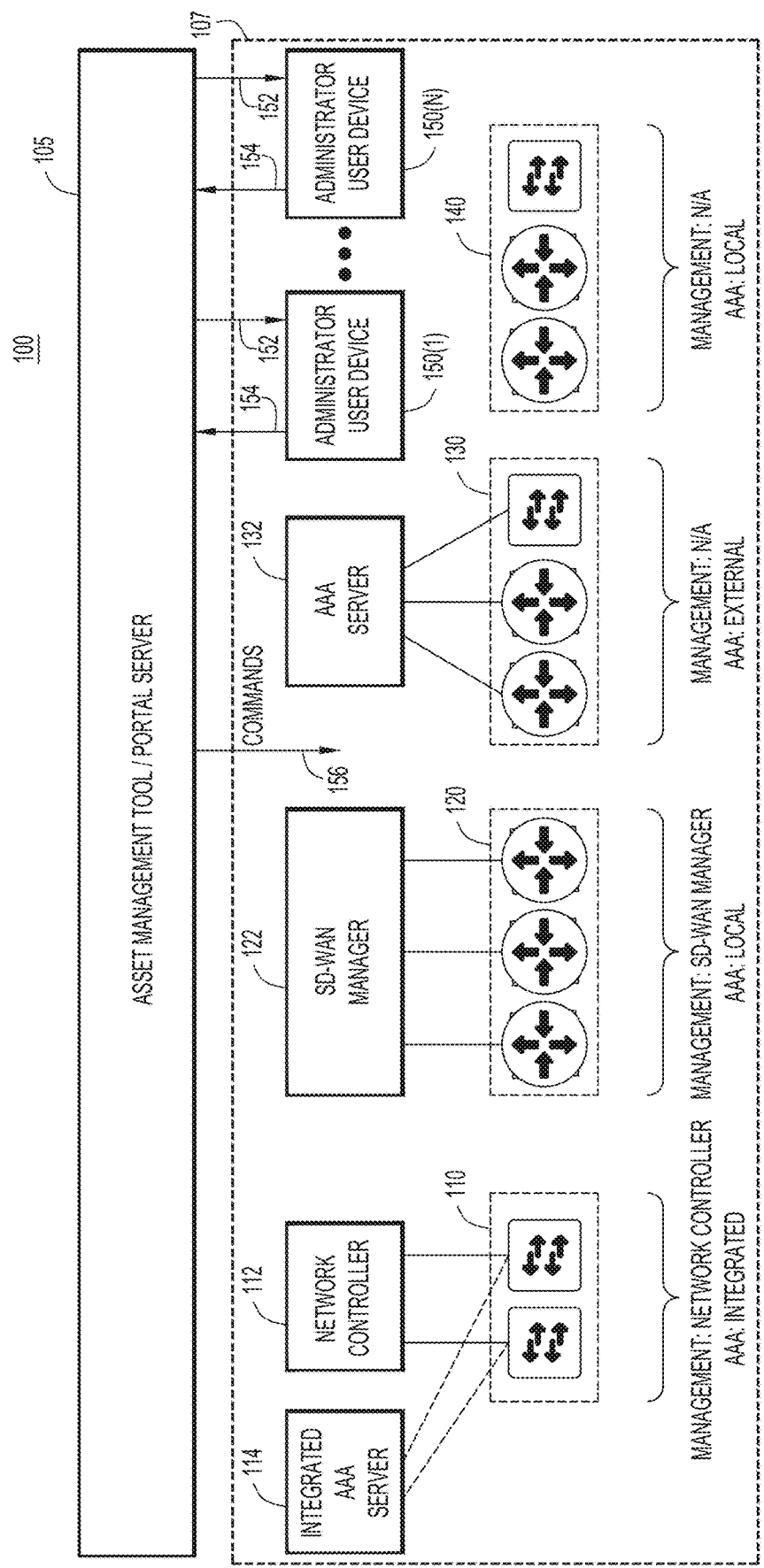
FIG. 1 is a block diagram of a networking environment and showing how different network assets may be managed by different management entities of an enterprise network, and for which the techniques presented herein may be employed.

FIG. 1 shows an example of an enterprise network environment 100 having different assets managed by different entities. An asset management tool/portal server 105 may provide overall visibility to the various networks assets in a network 107. The asset management tool/portal server 105 may be local to the network 107 or remote from the network 107, such as in the cloud. As an example, a first asset set 110 is managed by a network controller 112 and access control is managed by an integrated Authentication, Authorization and Accounting (AAA) server 114. A second asset set 120 is managed by a software-defined wide area network (SD-WAN) manager 122 and AAA functions are local. A third asset set 130 is not managed by any management entity but is instead managed directly via command line interface (CLI), Network Configuration Protocol (NETCONF), Application Programming Interfaces (APIs), etc. An external AAA server 132 provides access control to the third asset set 130. Finally, a fourth asset set 140 has no management entity and access is controlled by a local AAA function.

The asset management tool/portal server 105 may further be in network communication with a plurality of administrator user devices 150(1)-150(N), each associated with a particular administrator user. Using the techniques described further below, the asset management tool/portal server 105 may, once the administrator users for the various network devices are identified, send an electronic request 152 to one or more particular administrator users associated with particular network devices for approval to implement a diagnostic or a configuration change to address an identified network issue impacting the particular network devices. The asset management tool/portal server 105 may receive indications of approval 154 from the one or more particular administrator users, and send to the particular network devices one or more commands 156 to execute the diagnostic or the configuration change.

Figure 2:
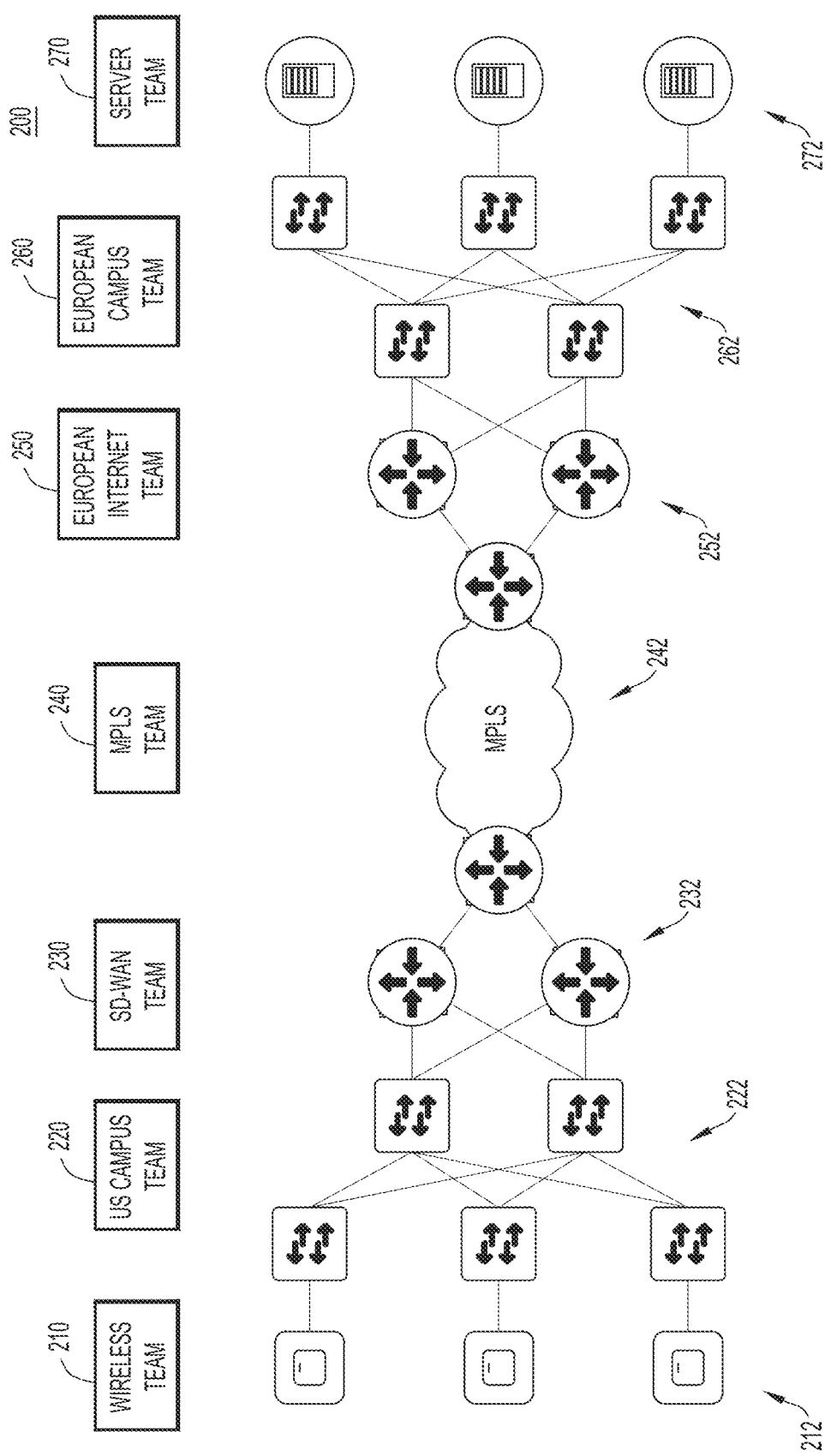
FIG. 2 is a block diagram of a networking environment and showing how different administrative teams of an enterprise may manage different network assets of the enterprise network, and for which the techniques presented herein may be employed.

There may be a multitude of teams that manage the various network assets in an enterprise network system. FIG. 2 shows an example of various network assets in an enterprise network environment 200 that may be managed by several different teams of administrators. Network assets (of the same type/managed in the same way) could be maintained by different teams based on an internal organizational split. For example, in the example of FIG. 2, a wireless team 210 manages the wireless network assets 212, a U.S. campus team 220 manages the wired network assets 222 on a campus, an SD-WAN team 230 manages the WAN assets 232, an MPLS team 240 manages the MPLS assets 242, a European Internet team 250 manages network assets 252, a European campus team 260 manages wired campus network assets 262 and a server team 270 manages servers 272.

The example arrangement shown in FIG. 2 can create a challenge, especially in scenarios where the network vendor would like to deliver added-value network-wide services while keeping relevant network administrators fully updated. Currently the solution is to send out messages using default contact details for the administrator identifiers gathered during sales activities or by relying on the data provided in the vendor's support tools. As has been observed through multiple campaigns where it is necessary to reach out to various people and teams in enterprise networks, these existing solutions typically fail. Usually there is about a 45% success rate in finding the right person. It is necessary to identify all of the relevant teams, but it is also necessary to identify the relevant individuals who know the network specifics, are familiar with the configurations and can make changes to various configurations. By determining the relevant teams and the relevant individuals on each team, the messages can be sent to (calls can be made with) the correct persons and the configuration changes can be made in a practical workflow on an end-to-end network path (e.g., from left to right in the network environment shown in FIG. 2).

Currently there is no way to know how to troubleshoot a problem in a heterogeneous network, and what exactly needs to be engaged in order to provide access to all of the assets and/or to have visibility as to what is going on for specific assets, and to ultimately have the end-to-end path of the assets that need to be troubleshooted.

For example, keeping relevant network administrators in the loop could be useful in the following scenarios:

1) Notification: informing relevant network administrator teams about planned or executed network-wide network troubleshooting/diagnostic algorithm activity run in their network (e.g. planned network-wide health-check scanning or particular part of the network; application of specific troubleshooting algorithm to limit impact of potential issues, such as failover of device to backup if a primary service experiences a memory leak or is affected by a specific field notice and will soon crash, etc.). The notification may be an electronic notification such as an email, text message, chat message within a chat application, telephone call, or any other electronic notification now known or hereinafter developed. Thus, the identifier of an administrator may be a corporate identifier that is tied to an email address or chat application identifier, or a telephone number, or a name from which an email address or chat application identifier can be determined through a directory lookup.

2) Approval: getting approval for running a specific change in the network to solve a particular issue, run potentially disruptive activity, etc.

3) Support: identifying all key administrator stakeholders involved in operating the enterprise network who are required to troubleshoot a given issue, etc.

Thus, although a network equipment vendor may have access to its deployed network devices, the vendor does not have accurate visibility into who at the customer side actually administers a given device. In this sense, having visibility means knowledge of what is happening with that device in terms of device type, configurations, etc., as well as knowledge gained from telemetry obtained from the device. Moreover, it is also useful to know who administers the device during a specific time frame as well (e.g., the last two weeks, a specified time period such as 10 Jan. and 10 May 2022, etc.) Without that information, it is not possible to notify, ask for approval or fully provide the needed support.

Presented herein are computer-implemented systems and methods for identifying individuals (e.g., administrators) who are managing specific set of assets in heterogeneous network environments where there are multiple types of network assets. Some assets are managed directly (logging directly on to them) and some assets are managed by an orchestrator (a third entity), and some may use external AAA methods or local AAA methods. Having this information will be useful for successful application of various use-cases including notifying relevant network administrators about discovered network-wide issues, requesting administrators to approve processes to be run on specific network devices for further diagnostics, providing the needed support in the network, providing extra points in 'continuous education' credits to specific administrators for actively maintaining specific network devices/configuration types, and visualizing administrators for a subset of devices that are part of troubleshooted topology/end-to-end packet flow.

The techniques presented herein involve methods to query (i.e., reverse query) an AAA server/controller/device to obtain a list of administrators for a given device. The query may be filtered for various attributes: time-period of login and device type (such as security, IP telephony, etc.). In addition, the techniques may involve a method to orchestrate a list of administrators for all devices along a path (e.g. to troubleshoot a path), and a method to visualize an overlay groups of network administrators on a topological representation of a network (both via Layer 2/Layer 3 (L2/L3) topology as well as grouping by network device type).

Figure 3:
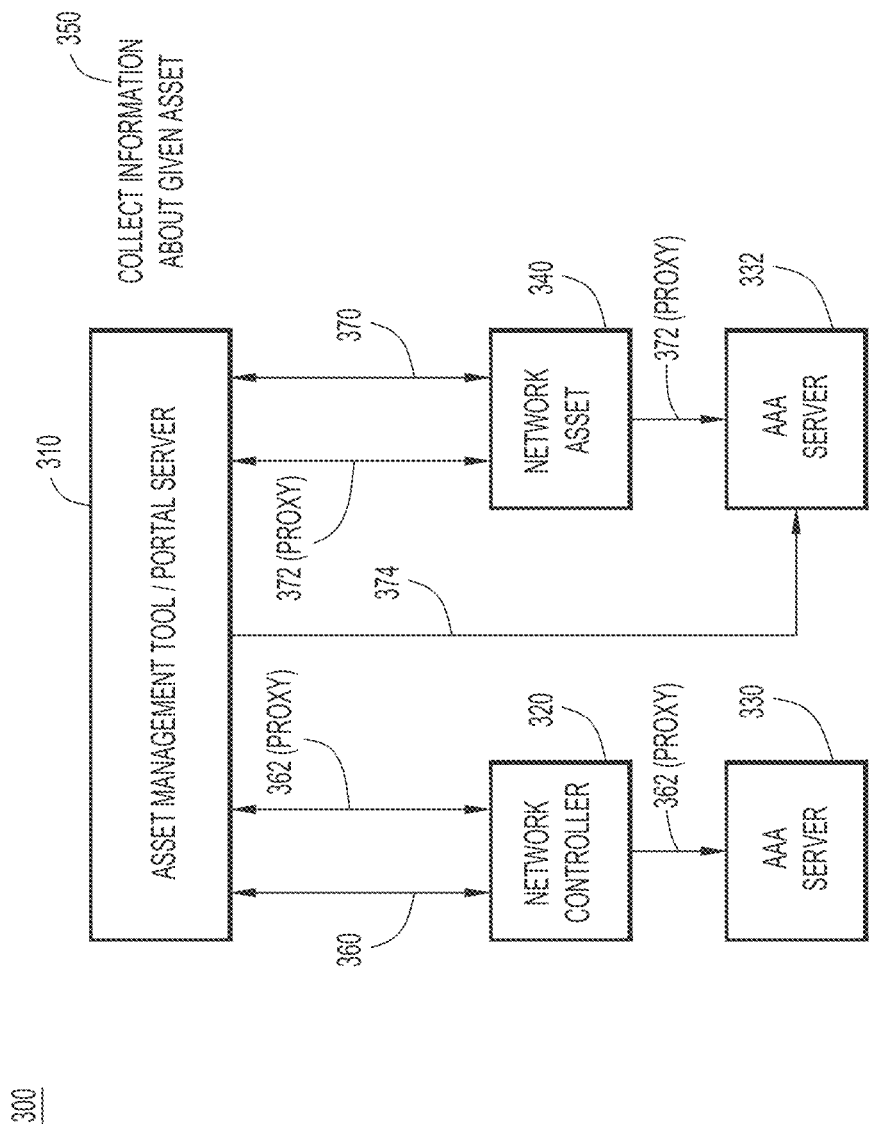
FIG. 3 illustrates a process for identifying relevant administrators associated with network assets of an enterprise network, according to an example embodiment.

Identification of relevant network administrators may be performed according to the process 300 depicted in FIG. 3. The process 300 involves interactions between the asset management tool or asset management portal server 310, network controller (orchestrator) 320, AAA servers 330 and 332, and network asset 340.

Identification of Management Entity and AAA Model

At 350, the asset management tool/portal server 310 collects information about the nature of a given asset including (but not limited to): identification of the management entity (standalone network asset, asset managed from an orchestrator (on-premises or cloud-based)) and the AAA model used for the network asset (local AAA server or external AAA server). Step 350 may be performed via any existing or hereinafter developed method such as through an API or NETCONF query, web-based access techniques to a network device, etc.

Identification of Relevant Customer Network Administrators

Depending on the discovered scenario in step 350 (management entity and AAA model used for a given network asset), a query is sent to a specific network asset, to an AAA server or to an orchestrator in order to determine a relevant list of (identifiers of) administrators that manage a specific network asset. The query can contain additional details such as:

- time range during which a specific network administrator was interacting with the network asset (this is to dynamically discover the most relevant administrator users),
- feature (accounting-filter) that was touched (to further filter the list of network administrators to a specific functionality—e.g. security aspects, call manager aspects, network configuration on the router, etc.).

If the network asset 340 is managed by a network controller, then at 360, if the AAA model is a local authentication use-case, the asset management tool/portal server 310 queries the network controller 320 to obtain a list of administrators who manage the network asset from the point of view of the network controller (orchestrator) 320. If the network asset is managed by a network controller and the AAA model is an external AAA server use-case, then at 362, the asset management tool/portal server 310 queries the network controller 320, which in turn proxies this request to the AAA server 330 to obtain from the AAA server a list of administrators who manage the given asset from the perspective of the AAA server 330.

If the network asset 340 is not managed by a network controller (orchestrator), and if the AAA model for the network asset 340 is a local authentication use-case, then at 370, the asset management tool/portal server 310 queries the network asset 340 directly to obtain a list of administrators who manage the network asset 340. If network asset 340 is not managed by a network controller (orchestrator), and if the AAA model for the network asset 340 is an external AAA server use case, then at 372, the asset management tool/portal server 310 queries the network asset 340 which in turn proxies the request to the AAA server 332, or queries the AAA server 332 directly at 374, to obtain a list of administrators who manage the network asset 340.

Thus, one aspect of the techniques presented herein is to determine the relevant individuals to whom the system can reach out to contact, notify, get approval from, etc. Another aspect of these techniques is to leverage an audit history pertaining to accesses made to a network asset because several individuals may have had access to, and/or made changes to the network asset. It may be desirable to know the appropriate individual (e.g., the last individual who most recently made a certain type of configuration change) who has accessed a given device. For example, one individual may have logged into the device and only did "show" commands, whereas another individual has higher level access privileges and that individual made actual configuration changes. Using the audit information (including access privilege information), the system can determine who merely logs in and does "show" commands and that person may just be notified about configuration changes or software upgrades/downgrades, whereas an individual who is determined to have configuration modification privileges needs to provide approval before a particular configuration is modified on that device. It is possible that different individuals are responsible for the configuration of certain features on a given device (e.g., a voice configuration on a device). After the one or more individuals are identified who have access to a network device, the attributes associated with the access rights of those individuals can be further determined in order to know which individuals need to merely be notified while other individuals need expressly approve of a particular feature or configuration change on a given device.

Query Mechanisms

Figure 4A:
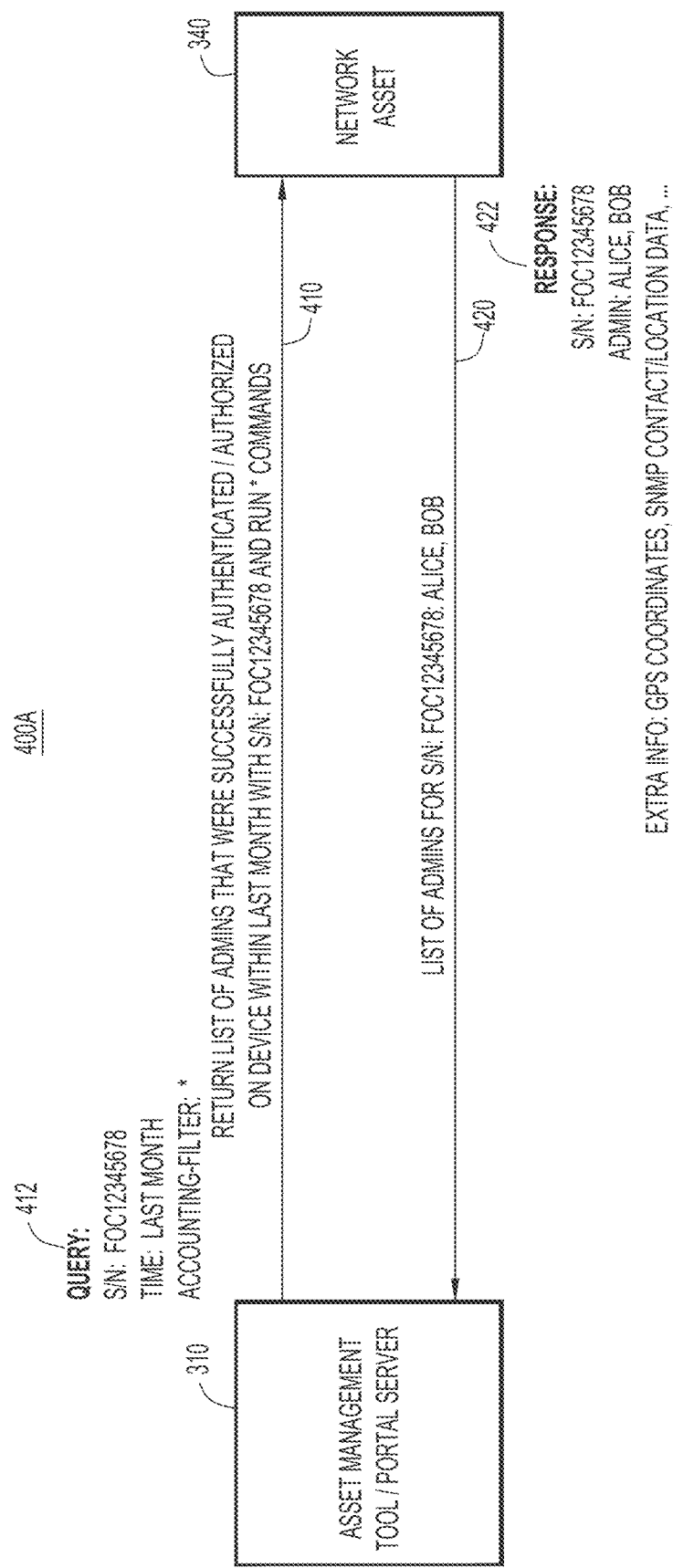
FIG. 4A illustrates a process for directly querying a network asset to determine a list of administrator users that have logged onto a network asset, according to an example embodiment.
Figure 4B:
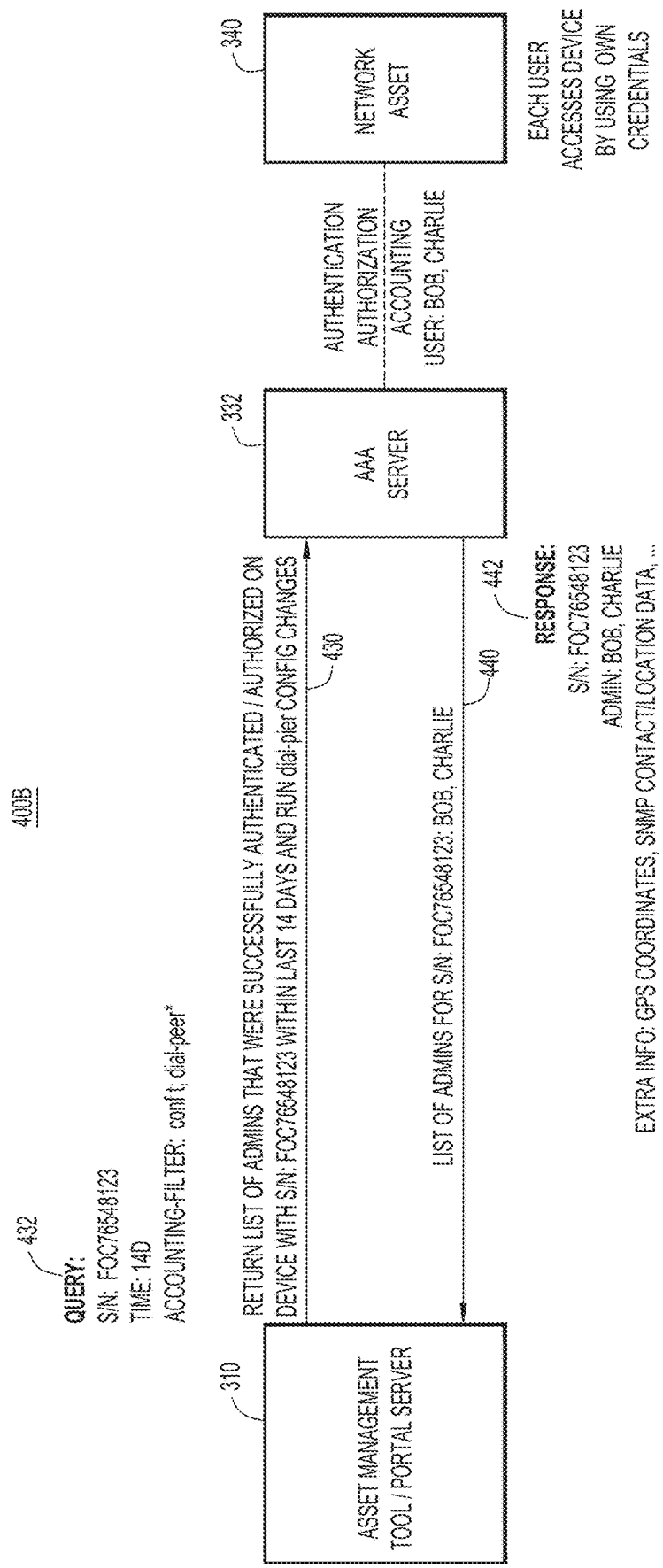
FIG. 4B illustrates a process for querying an authentication/authentication server to determine a list of administrative users that have logged onto a network asset whose access is managed by the authentication/authentication server, according to an example embodiment.
Figure 4C:
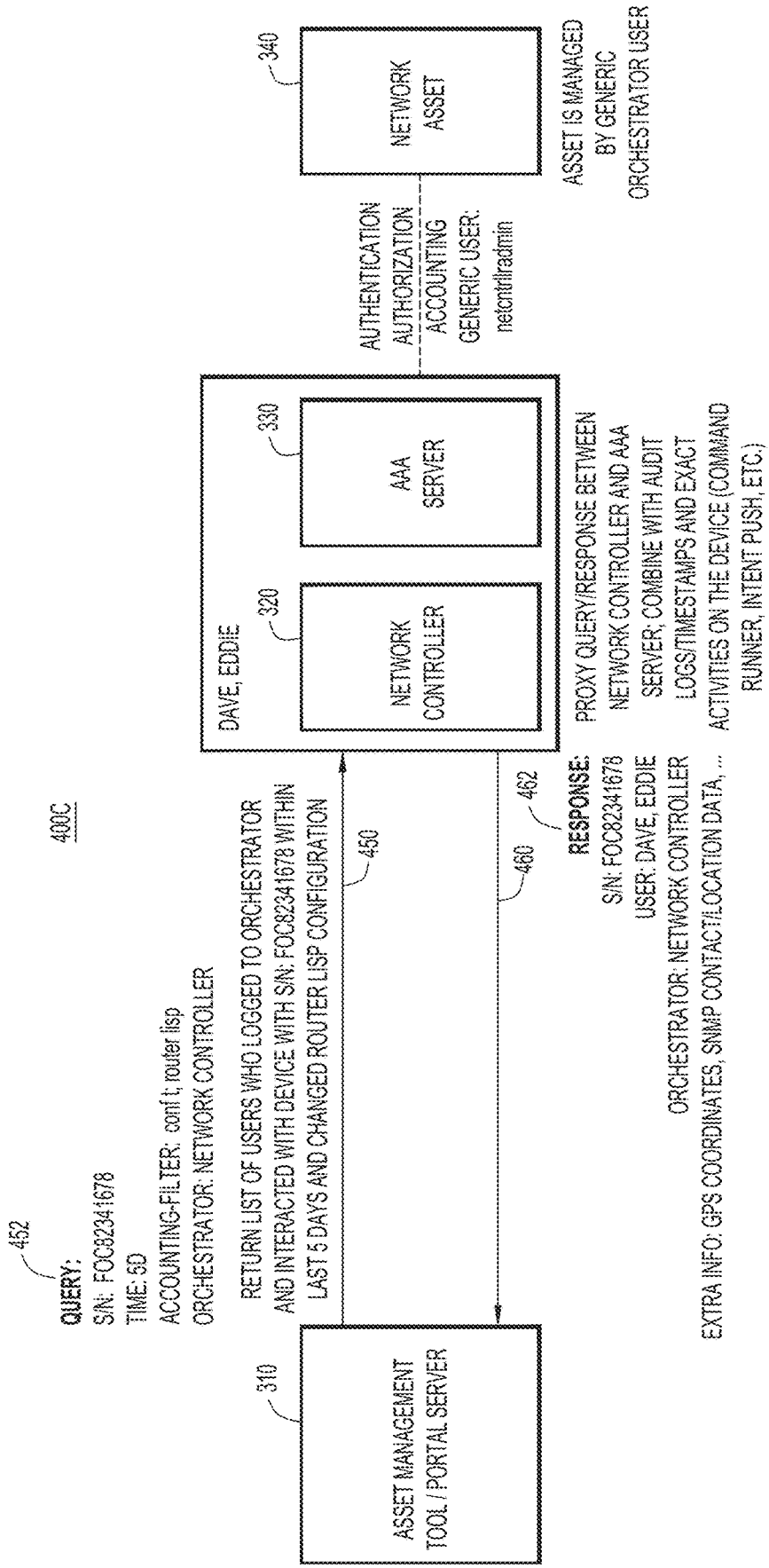
FIG. 4C illustrates a process by which a query is made to a network controller/orchestrator that proxies the query to an authentication/authentication server to determine a list of administrative users that have logged onto a network asset whose access is managed by the authentication/authentication server, according to an example embodiment.

Depending on the specific scenario (management entity and AAA model), there are several scenarios possible that eventually lead to the same result to obtain the most relevant/optimal list of administrators who manage a given network asset. Again, the goal is to determine who is/are the person/persons that access/accesses or configure a specific feature or some other aspect in a network. FIGS. 4A, 4B and 4C illustrate examples of such possible scenarios.

FIG. 4A illustrates a process 400A depicting a transaction exchange between the asset management tool/portal server 310 and a network asset 340 for a scenario where the query is made directly to a network asset and authentication is locally managed. At 410, the asset management tool/portal server 310 sends a query 412 to the network asset 340 (specified by Serial Number (S/N): FOC12345678) requesting the network asset 340 return a list of administrators that were successfully authenticated/authorized on the device within the last month and run any commands (where 'any' is indicated by the asterisk *). At 420, the network asset 340 sends a response 422 to the query that contains a list of administrators for device with S/N FOC12345678 (List=Alice, Bob). The response may further include additional information such as Global Positioning System (GPS) coordinates of the network asset 340, Simple Network Management Protocol (SNMP) contact/location data, etc.

Turning to FIG. 4B, a diagram is shown for a process 400B by which a request is made to AAA server 332 to determine who accesses a given network asset 340. As shown in FIG. 4B, the AAA server 332 maintains AAA details for various administrators (including Bob and Charlie), and each administrative user accesses the network asset 340 using his/her own credentials. At 430, the asset management tool/portal server 310 sends a query 432 to the AAA server 332 requesting a list of administrators that were successfully authenticated/authorized on the network asset 340 (with S/N: FOC76548123) within the last 14 days and who ran a "dial-pier" configuration change. At 440, the AAA server 332 sends a response 442 to the asset management tool/portal server 310, wherein the response 442 includes a list of administrators (List=Bob, Charlie) and other information.

Turning now to FIG. 4C, a diagram is shown for a process 400C by which a proxied query is made to network controller (orchestrator) 320 and AAA server 330 to determine who accesses a given network asset 340. As indicated in FIG. 4C, the network asset 340 is managed by a generic orchestrator user (the network controller 320) denoted "netcntrollradmin".

At 450, the asset management tool/portal server 310 sends a query 452 to the network controller 320 that requests a list of users who logged onto the network controller 320 (orchestrator) and interacted with the network asset 340 (device with S/N: FOC82341678) within the last 5 days and changed the "router lisp" configuration on the network asset 340. The network controller 320 proxies the query/response with the AAA server 330, combining with audit logs/timestamps and exact activities on the device (such as command runner, intent push, etc.). At 460, the network controller 320 sends a response 462 indicating that the administrator users Dave and Eddie are the users who satisfy the query 452.

Figure 5:
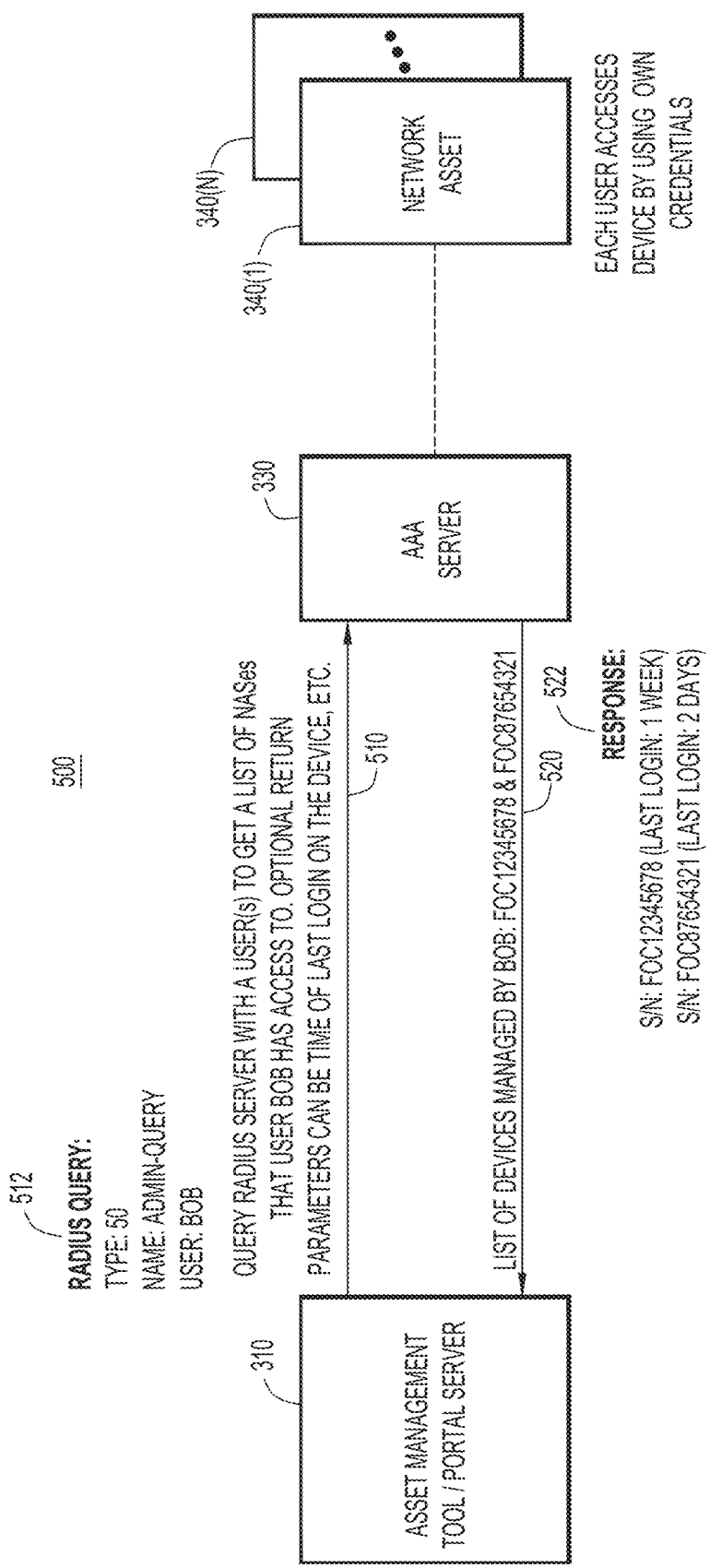
FIG. 5 illustrates a process for performing a reverse look-up at an authentication/authentication server to determine a list of a network assets that a particular administrator user has access, according to an example embodiment.

In addition to such enhanced accounting queries depicted in FIGS. 4A-4C, an approach is provided to obtain a list of the managed devices based on the network administrator user's name, as specified in the query. This process is shown in FIG. 5, to which reference is now made. FIG. 5 shows a process 500 by which a reverse look-up can be performed to obtain a list of network assets to which a given administrator user has access. In other words, the query asks: "What is User X's scope of control in the network?" This provides an understanding for different users as to what their span of control is in the network and what devices certain users have access to in the network. In FIG. 5, the AAA server 332 manages access to a plurality of network assets 340(1)-340 (N), by which each administrator user accesses a network asset using his/her own credentials.

At 510, the asset management tool/portal server 310 sends a query 512 to the AAA server 332. The query 512 includes the name or identity of one or more users (e.g., Bob) to obtain a list of network assets (NASes) to which the one or more users has/have access. The query 512 may optionally request parameters such as the time of last login on the device, etc. At 520, the AAA server 332 returns a response 522 that includes a list of network assets to which the user Bob has accessed (S/N: FOC12345678 and S/N: FOC87654321), and the last time Bob logged onto those network assets. The information learned from the process 500 may be visually presented in the with respect to the topology of the network.

Visualization

Figure 6:
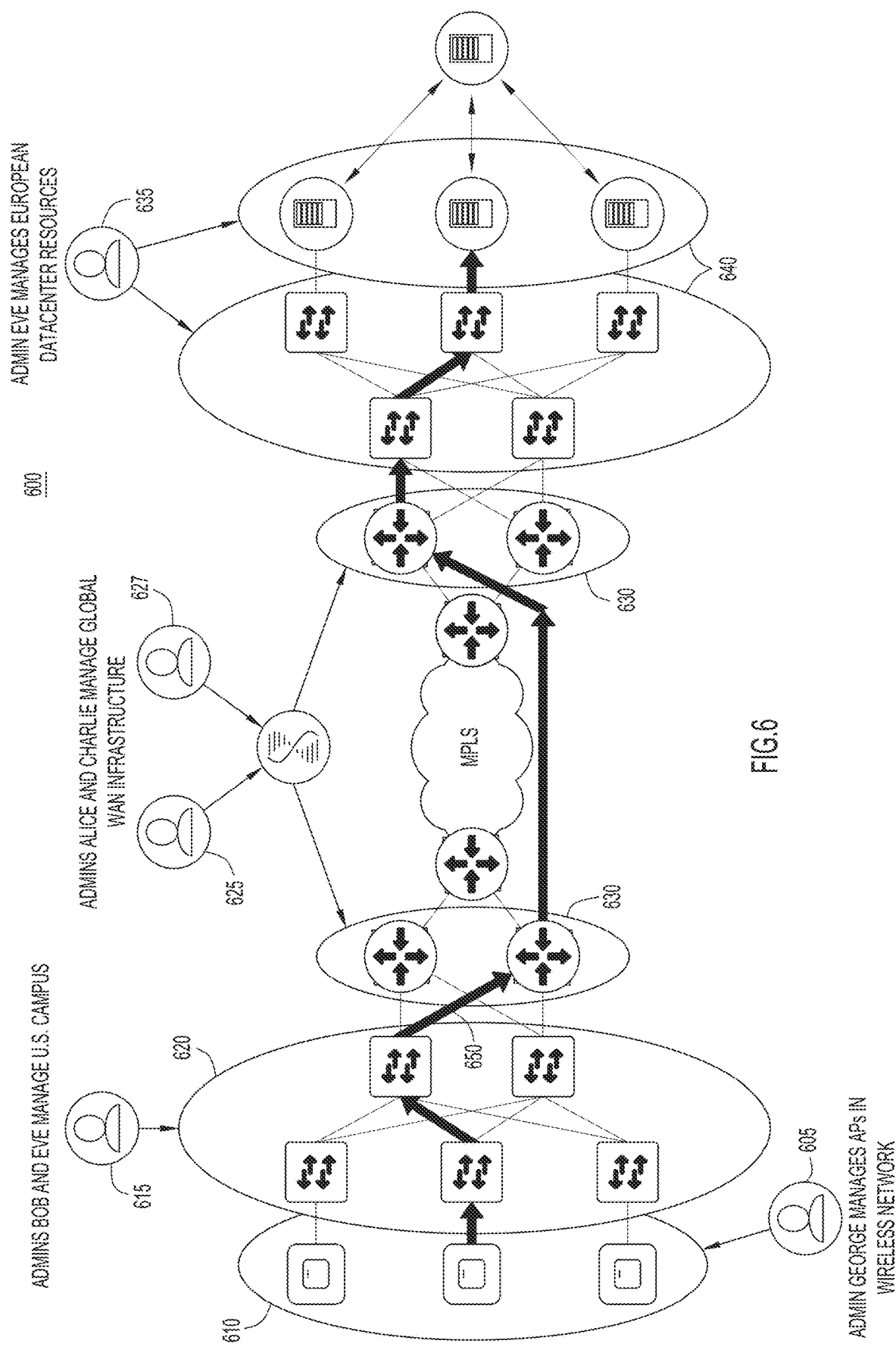
FIG. 6 illustrates an example of a display that may be generated to provide a visual representation of administrator users associated with network assets along an end-to-end path in a network topology of an enterprise network, according to an example embodiment.

The data collected through queries described above and collected as part of end-to-end workflow explained above, can be leveraged for a number of practical use-cases, including visualization of network administrators who manage all devices on a given troubleshooting packet-flow path. This is depicted in FIG. 6, which ties network topology with discovered groups of administrators, visually presenting that to improve troubleshooting activities by identifying an optimal number of administrators involved for effective end-to-end troubleshooting. In the visualization 600 of FIG. 6, administrator George 605 is shown as the manager of the access points in the wireless network 610. Administrators Bob and Eve, shown at 615, manage the U.S. campus network 620. Administrators Alice and Charlie, shown at 625 and 627, manage the global WAN infrastructure shown at 630. Administrator Eve, shown at 635, manages European datacenter resources 640. FIG. 6 further shows an end-to-end path 650 from one of the access points in the wireless network 610 to one of the servers in the European datacenter resources 640. In the example of FIG. 6, it can be seen that the optimal administrator list that needs to be engaged for troubleshooting the end-to-end path 650 is: George, Eve, Alice/Charlie.

Figure 7:
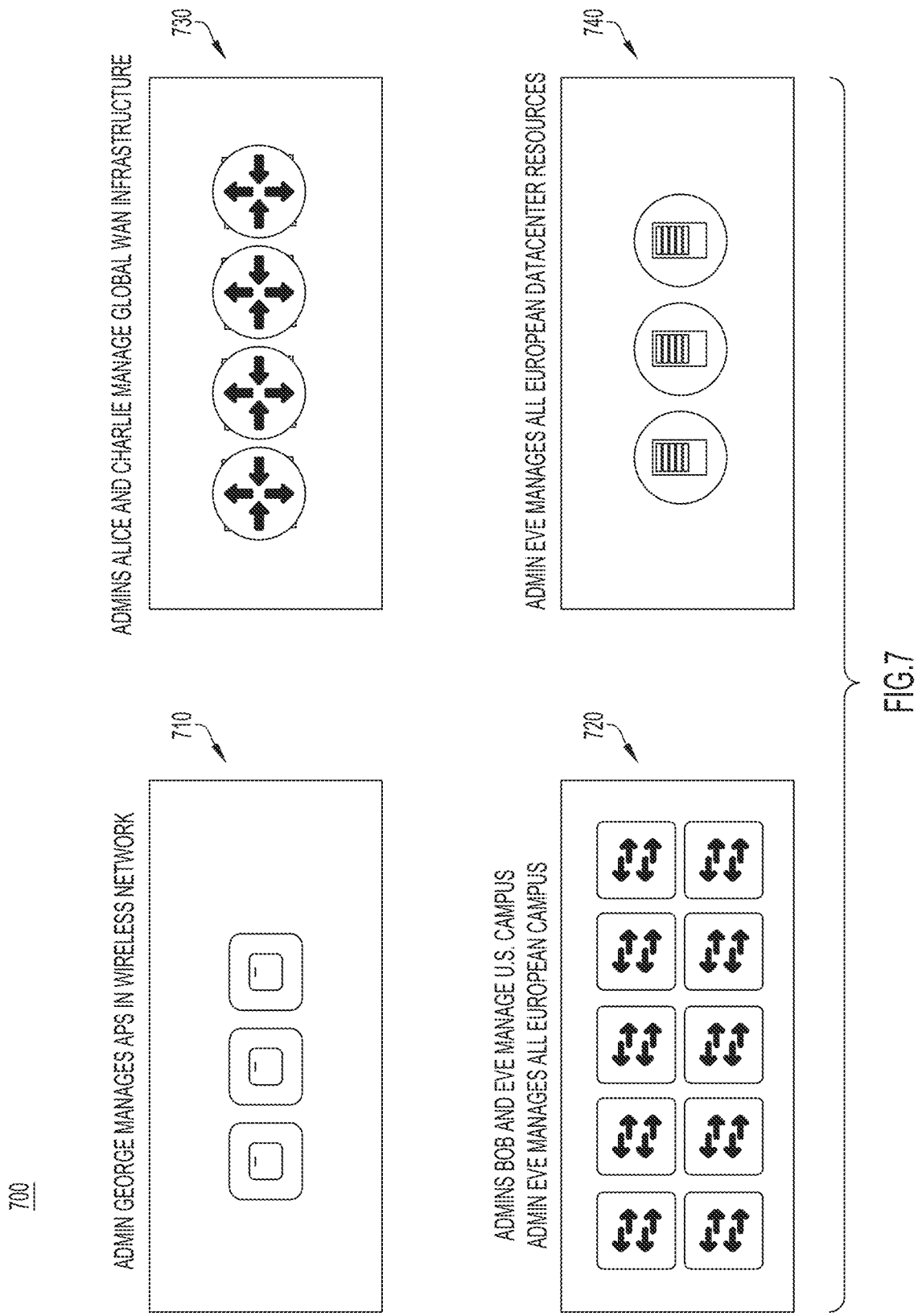
FIG. 7 illustrates an example of a display that may be generated to provide a visual representation of common administrators/administrator groups associated with network asset types in an enterprise network, according to an example embodiment.

Having a visualization created automatically for a given flow on end-to-end path can simplify and speed up troubleshooting processes as all required people can be identified and then quickly engaged to perform further issue triage and problem identification in a heterogeneous network environment. FIG. 7 illustrates another visualization 700 that allows for identifying common administrators/administrator groups for a given network asset type (e.g., switches, servers, routers, etc.), allowing for targeted notifications. For example, at 710, the visualization 700 shows that administrator George manages all the access point type devices. Similarly, at 720, the visualization 700 shows that administrators Bob and Eve are shown to manage all the (U.S. and European) campus equipment. At 730, the visualization 700 shows that administrators Alice and Charlie manage all the global WAN infrastructure equipment, and at 740, the visualization 700 shows that Eve manages all the European datacenter resources.

Figure 8:
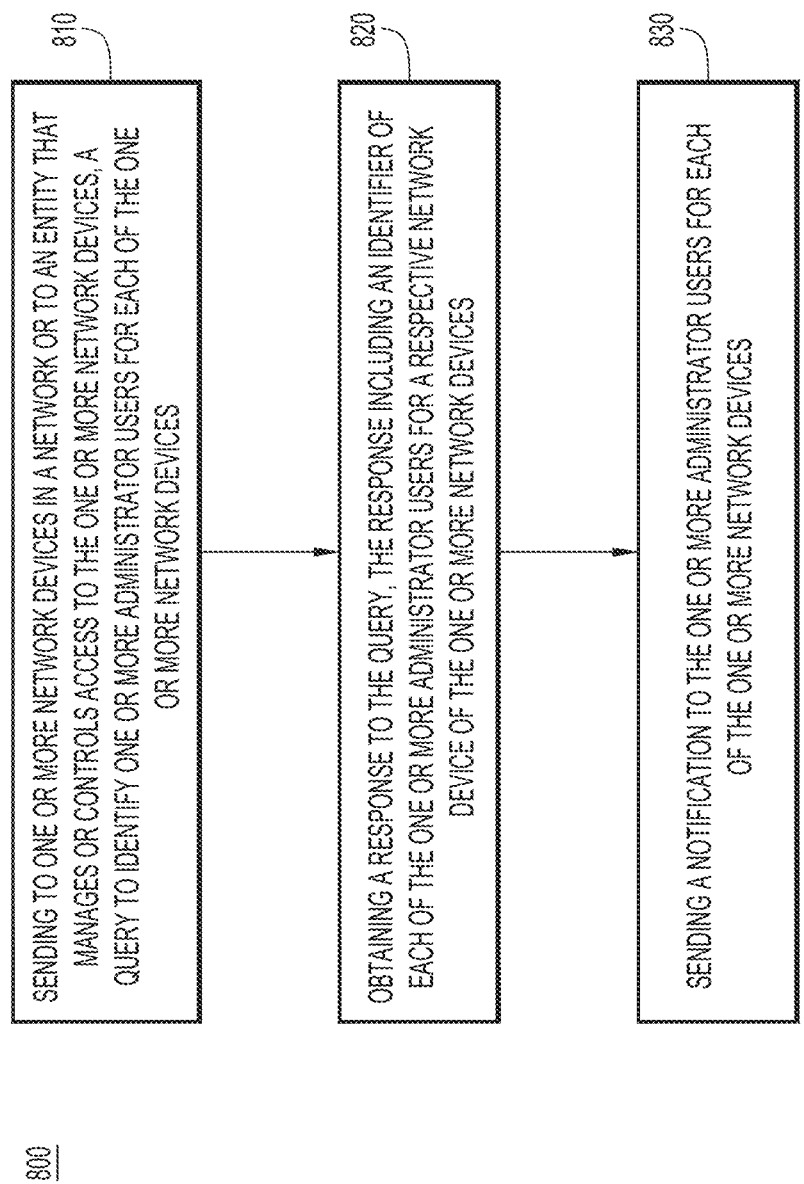
FIG. 8 is a flow chart depicting a method of identifying administrator users associated with network assets in a network and using that information to coordinate troubleshooting or configuration adjustment of the network, according to an example embodiment.

Reference is now made to FIG. 8, which illustrates a flow chart for a method 800 according to an example embodiment. In one example, the method 800 may be performed by the asset management tool/portal server 310 referred to above in connection with FIGS. 3-7. At step 810, the method 800 involves sending to one or more network devices in a network or to an entity that manages or controls access to the one or more network devices, a query to identify one or more administrator users for each of the one or more network devices. At step 820, the method 800 involves obtaining (receiving) a response to the query, the response including an identifier of each of the one or more administrator users for a respective network device of the one or more network devices. At step 830, the method 800 involves using the identifier of each of the one or more administrator users for each of the one or more network devices, sending a notification to the one or more administrator users for each of the one or more network devices.

The step of sending the notification may be made for purposes of performing, with respect to the one or more network devices, one or more of: coordinating troubleshooting of an issue; enabling a new feature; upgrading or downgrading software; and adjusting a configuration.

As explained above in connection with FIG. 4A, the query is sent directly to each of the one or more network devices to return a list of identifiers of one or more administrator users that were successfully authenticated/authorized on a respective network device of the one or more network devices.

Moreover, as explained in FIGS. 4B and 4C, the query is sent to an authentication/authorization server that manages access control to the one or more network devices, or to a network controller that proxies the query to the authentication/authorization server, to return a list of identifiers of one or more administrator users that were successfully authenticated/authorized on a respective network device of the one or more network devices.

In one form, the query specifies a particular network device attribute or feature that an administrator user may manage or adjust, to return a list of identifiers limited to only one or more administrator users that have managed or adjusted the particular network device attribute or feature In still another form, as described above, the query specifies a particular time range within which an administrator user has accessed a network device. This can be useful for allowing network forensic/diagnostic analysis for past network events.

As shown in FIG. 5, the method may further involve sending to an authentication/authorization server that manages access control to the one or more network devices a reverse-look query to obtain identifier information of network devices that a particular administrator user has accessed or managed.

As shown in FIG. 6, the method may further include generating for display a visual presentation of the one or more administrator users against a topological representation of the one or more network devices in the network. This can be used for identifying common administrator users or groups of administrator users for a given network device type. Further still, as shown in FIG. 6, the method may further include displaying a representation of an end-to-end path (e.g., path 650 shown in FIG. 6) in the visual presentation of the one or more administrator users against the topological representation of the network. For example, the method may still further include determining one or more particular administrator users associated with the one or more network devices along an end-to-end path in the network. In this case, the sending step 830 may include sending to the one or more particular administrator users an electronic notification indicating a network issue impacting the end-to-end path in the network.

Further still, as depicted in FIG. 1, the sending step 830 may include the asset management tool/portal server 105 sending an electronic request to one or more particular administrator users associated with particular network devices for approval to implement a diagnostic or a configuration change to address an identified network issue impacting the particular network devices. The method may further include receiving indications of approval from the one or more particular administrator users; and sending to the particular network devices one or more commands to execute the diagnostic or the configuration change.

As explained above, in heterogenous network environments, there is a challenge in identifying who is the 'right' person to notify in connection with sending a notification to the one or more administrator users for each of the one or more network devices for purposes of coordinating troubleshooting of an issue or adjusting a configuration in the network. This may vary by device type and location. The techniques presented herein involve identifying the correct person(s) associated with an enterprise network site who can administer a specific device(s) in the network. Furthermore, these techniques leverage that data to identify administrators along a troubleshooting path, or for visualizing groups of administrators to target for network configuration adoption activities.

There are no solutions heretofore known that determine operationally active administrators for a given network asset (in a given time span), and/or orchestrate a list of administrators for selected network devices along a path (e.g., to troubleshoot a specific traffic flow that traverses multiple network devices/assets). Moreover, there is no solution known that can identify the right person or persons to be notified for purposes of diagnosing an issue in a network and applying a configuration adjustment to the network devices to address the issue, or to visualize a group of administrators to target for various remedial actions. The techniques presented herein are native to the device authentication process and are therefore authoritative and vendor agnostic. This provides a significant and unique technical advantage over existing authentication/authorization server capabilities through native protocol enhancements, and solves the real-world issue of both determining the administrator of a device, and also determining administrators along a path through a network.

Figure 9:
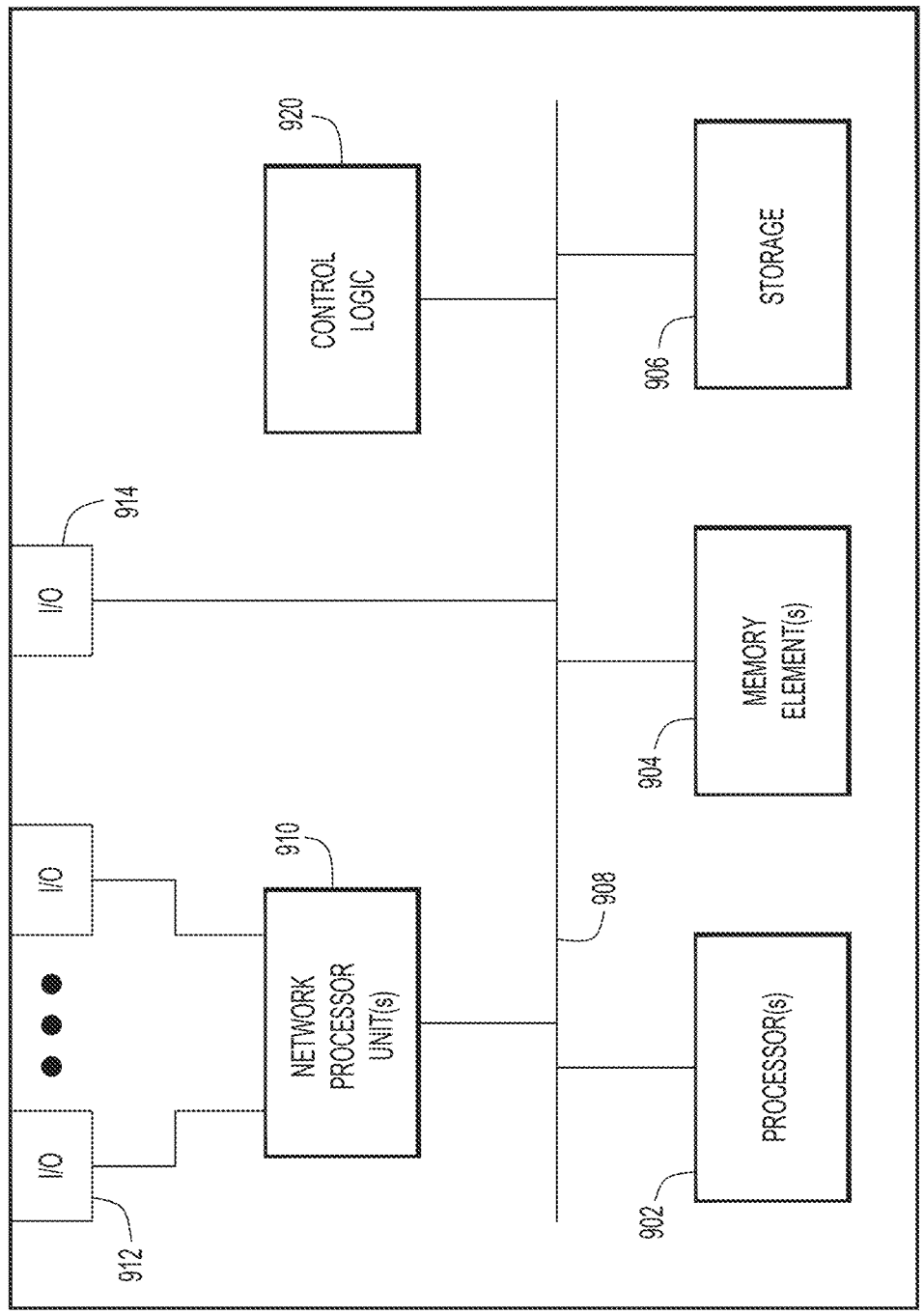
FIG. 9 is a hardware block diagram of a device that may be configured to perform the operations involved in the techniques presented herein, according to an example embodiment.

Referring to FIG. 9, FIG. 9 illustrates a hardware block diagram of a computing/computer device 900 that may perform functions of a device associated with operations discussed herein in connection with the techniques depicted in FIGS. 1-8. In various embodiments, a computing device, such as computing device 900 or any combination of computing devices 900, may be configured as any devices as discussed for the techniques depicted in connection with FIGS. 1-8 (such as for the asset management tool/portal server 105 shown in FIG. 1 and the asset management tool/portal server 310 shown in FIGS. 3, 4A-4C, 5 and 6-8) in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, mouse, display, a touch screen display, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

In sum, in some aspects, the techniques described herein relate to a method including: sending to one or more network devices in a network or to an entity that manages or controls access to the one or more network devices, a query to identify one or more administrator users for each of the one or more network devices; obtaining a response to the query, the response including an identifier of each of the one or more administrator users for a respective network device of the one or more network devices; and using the identifier of each the one or more administrator users for each of the one or more network devices, sending a notification to the one or more administrator users for each of the one or more network devices.

In some aspects, the techniques described herein relate to a method, wherein sending the notification is for purposes of performing, with respect to the one or more network devices, one or more of: coordinating troubleshooting of an issue; enabling a new feature; upgrading or downgrading software; and adjusting a configuration.

In some aspects, the query is sent directly to each of the one or more network devices to return a list of identifiers of one or more administrator users that were successfully authenticated/authorized on a respective network device of the one or more network devices.

In some aspects, the query is sent to an authentication/authorization server that manages access control to the one or more network devices, or to a network controller that proxies the query to the authentication/authorization server, to return a list of identifiers of one or more administrator users that were successfully authenticated/authorized on a respective network device of the one or more network devices.

In some aspects, the query specifies a particular network device attribute or feature that an administrator user may manage or adjust, to return a list of identifiers limited to only one or more administrator users that have managed or adjusted the particular network device attribute or feature.

In some aspects, the query specifies a particular time range within which an administrator user has accessed a network device.

In some aspects, the techniques described herein relate to a method, further including: sending to an authentication/authorization server that manages access control to the one or more network devices a reverse-look query to obtain identifier information of network devices that a particular administrator user has accessed or managed.

In some aspects, the techniques described herein relate to a method, further including: generating for display a visual presentation of the one or more administrator users against a topological representation of the one or more network devices in the network.

In some aspects, the techniques described herein relate to a method, further including: identifying common administrator users or groups of administrator users for a given network device type.

In some aspects, the techniques described herein relate to a method, further including: displaying a representation of an end-to-end path in the visual presentation of the one or more administrator users against the topological representation of the network.

In some aspects, the techniques described herein relate to a method, further including: determining one or more particular administrator users associated with the one or more network devices along an end-to-end path in the network, wherein sending includes sending to the one or more particular administrator users an electronic notification indicating a network issue impacting the end-to-end path in the network.

In some aspects, the techniques described herein relate to a method, wherein sending includes: sending an electronic request to one or more particular administrator users associated with particular network devices for approval to implement a diagnostic or a configuration change to address an identified network issue impacting the particular network devices.

In some aspects, the techniques described herein relate to a method, further including: receiving indications of approval from the one or more particular administrator users; and sending to the particular network devices one or more commands to execute the diagnostic or the configuration change.

In some aspects, the techniques described herein relate to an apparatus including: a network interface that enables communication with network devices in a network; one or more processor devices; and at least one memory device that stores software instructions for execution by the one or more processor devices, which cause the one or more processor devices to perform operations including: sending to one or more network devices in the network or to an entity that manages or controls access to the one or more network devices, a query to identify one or more administrator users for each of the one or more network devices; obtaining a response to the query, the response including an identifier of each of the one or more administrator users for a respective network device of the one or more network devices; and using the identifier of each the one or more administrator users for each of the one or more network devices, sending a notification to the one or more administrator users for each of the one or more network devices.

In some aspects, the techniques described herein relate to one or more non-transitory computer readable storage media encoded with software instructions that, when executed by one or more processor devices, cause the one or more processor devices to perform operations including: sending to one or more network devices in a network or to an entity that manages or controls access to the one or more network devices, a query to identify one or more administrator users for each of the one or more network devices; obtaining a response to the query, the response including an identifier of each of the one or more administrator users for a respective network device of the one or more network devices; and using the identifier of each the one or more administrator users for each of the one or more network devices, sending a notification to the one or more administrator users for each of the one or more network devices.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
sending, by a device associated with a network, to one or more network devices in the network or to an entity that manages or controls access to the one or more network devices, a query to identify identities of one or more administrator users for each of the one or more network devices, wherein the identities of the one or more administrator users are not known to the device, wherein each of the one or more network devices is associated with an asset of the network, and wherein each of the one or more network devices or the entity that manages or controls access to each of the one or more network devices has access to the identities of the one or more administrator users that have been authenticated/authorized on a respective network device of the one or more network devices or the entity that manages or controls access to the respective network device;
obtaining a response to the query, the response including an identifier of each of the one or more administrator users for the respective network device of the one or more network devices, the identifier being associated with contact information for a respective administrator user of the one or more administrator users; and
using the identifier of each the one or more administrator users for each of the one or more network devices, sending a notification to the one or more administrator users for each of the one or more network devices.

2. The method of claim 1, wherein sending the notification is for purposes of performing, with respect to the one or more network devices, one or more of: coordinating troubleshooting of an issue; enabling a new feature; upgrading or downgrading software; and adjusting a configuration.

3. The method of claim 1, wherein the query is sent directly to each of the one or more network devices to return a list of identifiers of one or more administrator users that were successfully authenticated/authorized on a respective network device of the one or more network devices.

4. The method of claim 1, wherein the query is sent to an authentication/authorization server that manages access control to the one or more network devices, or to a network controller that proxies the query to the authentication/authorization server, to return a list of identifiers of one or more administrator users that were successfully authenticated/authorized on the respective network device of the one or more network devices.

5. The method of claim 1, wherein the query specifies a particular network device attribute or feature that an administrator user may manage or adjust, to return a list of identifiers limited to only one or more administrator users that have managed or adjusted the particular network device attribute or feature.

6. The method of claim 1, wherein the query specifies a particular time range within which an administrator user has accessed a network device.

7. The method of claim 1, further comprising:
sending to an authentication/authorization server that manages access control to the one or more network devices a reverse-look query to obtain identifier information of network devices that a particular administrator user has accessed or managed.

8. The method of claim 1, further comprising:
generating for display a visual presentation of the one or more administrator users against a topological representation of the one or more network devices in the network.

9. The method of claim 8, further comprising:
identifying common administrator users or groups of administrator users for a given network device type.

10. The method of claim 8, further comprising:
displaying a representation of an end-to-end path in the visual presentation of the one or more administrator users against the topological representation of the network.

11. The method of claim 1, further comprising:
determining one or more particular administrator users associated with the one or more network devices along an end-to-end path in the network,
wherein sending includes sending to the one or more particular administrator users an electronic notification indicating a network issue impacting the end-to-end path in the network.

12. The method of claim 1, wherein sending comprises:
sending an electronic request to one or more particular administrator users associated with particular network devices for approval to implement a diagnostic or a configuration change to address an identified network issue impacting the particular network devices.

13. The method of claim 12, further comprising:
receiving indications of approval from the one or more particular administrator users; and
sending to the particular network devices one or more commands to execute the diagnostic or the configuration change.

14. An apparatus comprising:
a network interface that enables communication with network devices in a network;
one or more processor devices; and
at least one memory device that stores software instructions for execution by the one or more processor devices, which cause the one or more processor devices to perform operations including:
sending to one or more network devices in the network or to an entity that manages or controls access to the one or more network devices, a query to identify identities of one or more administrator users for each of the one or more network devices, wherein the identities of the one or more administrator users are not known to the apparatus, wherein each of the one or more network devices is associated with an asset of the network, and wherein each of the one or more network devices or the entity that manages or controls access to each of the one or more network devices has access to the identities of the one or more administrator users that have been authenticated/authorized on a respective network device of the one or more network devices or the entity that manages or controls access to the respective network device;
obtaining a response to the query, the response including an identifier of each of the one or more administrator users for the respective network device of the one or more network devices, the identifier being associated with contact information for a respective administrator user of the one or more administrator users; and
using the identifier of each the one or more administrator users for each of the one or more network devices, sending a notification to the one or more administrator users for each of the one or more network devices.

15. The apparatus of claim 14, wherein sending the notification is for purposes of performing, with respect to the one or more network devices, one or more of: coordinating troubleshooting of an issue; enabling a new feature; upgrading or downgrading software; and adjusting a configuration.

16. The apparatus of claim 14, wherein the query is sent directly to each of the one or more network devices to return a list of identifiers of one or more administrator users that were successfully authenticated/authorized on the respective network device of the one or more network devices.

17. The apparatus of claim 14, wherein the query is sent to an authentication/authorization server that manages access control to the one or more network devices, or to a network controller that proxies the query to the authentication/authorization server, to return a list of identifiers of one or more administrator users that were successfully authenticated/authorized on a respective network device of the one or more network devices.

18. The apparatus of claim 14, wherein the software instructions cause the one or more processor devices to perform:
sending to an authentication/authorization server that manages access control to the one or more network devices a reverse-look query to obtain identifier information of network devices that a particular administrator user has accessed or managed.

19. One or more non-transitory computer readable storage media encoded with software instructions that, when executed by one or more processor devices, cause the one or more processor devices to perform operations including:
sending to one or more network devices in a network or to an entity that manages or controls access to the one or more network devices, a query to identify identities of one or more administrator users for each of the one or more network devices, wherein each of the one or more network devices is associated with an asset of the network, and wherein each of the one or more network devices or the entity that manages or controls access to each of the one or more network devices has access to the identities of the one or more administrator users that have been authenticated/authorized on a respective network device of the one or more network devices or the entity that manages or controls access to the respective network device;
obtaining a response to the query, the response including an identifier of each of the one or more administrator users for a respective network device of the one or more network devices, the identifier being associated with contact information for a respective administrator user of the one or more administrator users; and
using the identifier of each the one or more administrator users for each of the one or more network devices, sending a notification to the one or more administrator users for each of the one or more network devices.

20. The one or more non-transitory computer readable storage media of claim 19, wherein sending the notification is for purposes of performing, with respect to the one or more network devices, one or more of: coordinating troubleshooting of an issue; enabling a new feature; upgrading or downgrading software; and adjusting a configuration.

* * * * *